United States Patent
Jia et al.

(10) Patent No.: US 8,023,041 B2
(45) Date of Patent: Sep. 20, 2011

(54) DETECTION OF MOVING INTERLACED TEXT FOR FILM MODE DECISION

(75) Inventors: Yunwei Jia, Milton (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1462 days.

(21) Appl. No.: 11/343,119

(22) Filed: Jan. 30, 2006

(65) Prior Publication Data

US 2007/0188607 A1    Aug. 16, 2007

(51) Int. Cl.
*H04N 7/01*    (2006.01)
*H04N 5/14*    (2006.01)
*H04N 5/228*   (2006.01)

(52) U.S. Cl. ............... 348/452; 348/700; 348/208.1

(58) Field of Classification Search ............ 348/97, 348/701, 445, 452, 700, 208.1, 550, 607
See application file for complete search history.

(56) References Cited

U.S. PATENT DOCUMENTS

| | | | |
|---|---|---|---|
| 7,129,990 B2 * | 10/2006 | Wredenhagen et al. | 348/449 |
| 7,349,029 B1 * | 3/2008 | Chou | 348/448 |
| 7,522,221 B2 * | 4/2009 | Swartz | 348/700 |
| 2005/0078215 A1 * | 4/2005 | Swartz | 348/452 |

OTHER PUBLICATIONS

Yunwei Jia, Lowell Winger and Elliot Linzer, Method for Robust Inverse Telecine, U.S. Appl. No. 11/272,300, filed Nov. 10, 2005.
Yunwei Jia and Lowell Winger, "Unified Approach to Film Mode Detection", U.S. Appl. No. 11/314,631, filed Dec. 20, 2005.

* cited by examiner

*Primary Examiner* — David Ometz
*Assistant Examiner* — Ahmed Berhan
(74) *Attorney, Agent, or Firm* — Christopher P. Maiorana, PC (57) ABSTRACT

A method for detecting moving interlaced text in a video sequence originating through telecine is disclosed. The method generally includes the steps of (A) checking a motion condition of a current block in a current field in the video sequence for motion both (i) from a previous field in the video sequence to the current field and (ii) from the current field to a next field in the video sequence, (B) checking an artifact condition of the current block for a plurality of symmetric interlaced artifacts in both (i) a forward temporal direction and (ii) a backward temporal direction and (C) asserting a block motion indicator for the current block if all of (i) the motion condition is true and (ii) the artifact condition is true.

20 Claims, 7 Drawing Sheets

| Sequence | Number of Fields | False Positives | False Negatives | Moving Text Appearance |
|---|---|---|---|---|
| SPR1 (720x480p) | 2986 | 0 | 0 | none |
| SPR2 (720x480p) | 2998 | 0 | 0 | none |
| BL_smoke (720x480p) | 398 | 0 | 0 | none |
| SST (720x480p) | 1974 | 0 | 0 | none |
| SST20 (720x480p) | 2016 | 0 | 0 | none |
| SST21 (720x480p) | 2072 | 0 | 0 | none |
| SST22 (720x480p) | 2006 | 0 | 0 | none |
| SST23 (720x480p) | 2028 | 0 | 0 | none |
| SST24 (720x480p) | 2006 | 0 | 0 | none |
| cyclists (1280x720p) | 1198 | 0 | 0 | none |
| harbor (1280x720p) | 1198 | 0 | 0 | none |
| optis (1280x720p) | 1198 | 0 | 0 | none |
| raven (1280x720p) | 1198 | 0 | 0 | none |
| night (1280x720p) | 918 | 0 | 0 | none |
| sunflower (1920x1080p) | 998 | 0 | 0 | none |
| rush_hour (1280x720p) | 998 | 0 | 0 | none |
| river_bed (1280x720p) | 498 | 0 | 0 | none |
| twister (720x480p) | 4924 | 0 | 0 | none |
| twister_letterbox (720x480p) | 4926 | 0 | 0 | none |
| BL_13_0 (720x480p) | 7206 | 0 | 0 | none |
| BL_13_1 (720x480p) | 4400 | 0 | 0 | none |
| BL_20_0 (720x480p) | 5734 | 0 | 0 | none |
| BL_20_1 (720x480p) | 8234 | 0 | 0 | none |
| BL_21_0 (720x480p) | 2222 | 0 | 0 | none |
| BL_21_1 (720x480p) | 7238 | 0 | 0 | none |
| mobcal_ter (1280x720p) | 1006 | 0 | 0 | none |
| parkrun_ter (1280x720p) | 1006 | 0 | 0 | none |
| shields_ter (1280x720p) | 1006 | 0 | 0 | none |
| stockholm_ter (1280x720p) | 1006 | 0 | 0 | none |
| city (1280x720p) | 1798 | 0 | 0 | none |
| crew (1280x720p) | 1198 | 0 | 0 | none |
| preakness (1280x720p) | 1198 | 0 | 0 | none |
| sailorman (1280x720p) | 1198 | 0 | 0 | none |
| sheriff (1280x720p) | 1198 | 0 | 0 | none |
| shuttle_start (1280x720p) | 1198 | 0 | 0 | none |
| big_ship (1280x720p) | 1198 | 0 | 0 | none |
| jets (1280x720p) | 1098 | 0 | 0 | none |
| panslow (1280x720p) | 1098 | 0 | 0 | none |
| spincalendar (1280x720p) | 1098 | 0 | 0 | none |
| blue_sky (1920x1080p) | 498 | 0 | 0 | none |
| pedistrian_area (1920x1080p) | 748 | 0 | 0 | none |
| tractor (1920x1080p) | 1518 | 0 | 0 | none |
| station2 (1920x1080p) | 624 | 0 | 0 | none |
| tractor (1920x1080p) | 1518 | 0 | 0 | none |
| station2 (1920x1080p) | 624 | 0 | 0 | none |
| dinosaur (720x576p) | 13800 | 0 | 0 | none |

FIG. 6

| Sequence | Number of Fields | False Positives | False Negatives | Moving Text Appearance |
|---|---|---|---|---|
| fade (720x480) | 2044 | 0 | 0 | none |
| BMW_Star_0 (720x480) | 4000 | 0 | 0 | none |
| BMW_Star_1 (720x480) | 4000 | 0 | 0 | none |
| BMW_Star_2 (720x480) | 4000 | 0 | 0 | none |
| BMW_Driving_0 (720x480) | 4000 | 0 | 0 | none |
| BMW_Driving_1 (720x480) | 4000 | 0 | 0 | none |
| BMW_Driving_2 (720x480) | 4000 | 0 | 0 | none |
| BMW_Driving_3 (720x480) | 4000 | 0 | 0 | none |
| BMW_Driving_4 (720x480) | 1664 | 0 | 0 | none |
| BMW_Chosen_0 (720x480) | 4000 | 0 | 0 | none |
| BMW_Chosen_1 (720x480) | 4000 | 0 | 0 | none |
| BMW_Chosen_2 (720x480) | 4000 | 0 | 0 | none |
| MIP_0 (720x480) | 1998 | 0 | 10 | none |
| MIP_1 (720x480) | 1998 | 0 | 0 | none |
| MIP_2 (720x480) | 1998 | 0 | 0 | none |
| MIP_3 (720x480) | 1998 | 0 | 0 | none |
| MIP_4 (720x480) | 2592 | 0 | 0 | none |

FIG. 7

| Sequence | Number of Fields | False Positives | False Negatives | Moving Text Appearance |
|---|---|---|---|---|
| UniversalStudios_Babe (720x576) | 1252 | 6 | 25 | 66-1166, 1186-1250 |
| Tissue (720x480) | 1530 | 8 | 26 | 220-856, 896-1530 |

FIG. 8

| Sequence | Number of Fields | False Positives | False Negatives | Moving Text Appearance at Fields: |
|---|---|---|---|---|
| CNN_commercial (720x480) | 1400 | 1 | 4 | 280-750 |
| Deep_Impact (720x480) | 2532 | 9 | 4 | 10-540,606-1054, 1110-1514,1566-2132 2222-2830,2888-3404 3478-3768,3828-4120 4194-4484,4550-5030 |
| HQV_MixedContent (720x480) | 4200 | 13 | 36 | 300-1100, 1170-2130 2324-3122, 3222-4186 |

FIG. 9

DETECTION OF MOVING INTERLACED TEXT FOR FILM MODE DECISION

CROSS REFERENCE TO RELATED APPLICATIONS

This application is related to U.S. patent application Ser. No. 11/272,300, filed Nov. 10, 2005, and Ser. No. 11/314,631, filed Dec. 20, 2005 which are hereby incorporated by reference in their entirety.

FIELD OF THE INVENTION

The present invention relates to inverse telecine generally and, more particularly, to a detection of moving interlaced text for film mode decision.

BACKGROUND OF THE INVENTION

Films are commonly shot at 24 frames per second. In order to play a film on a television set smoothly, the film has to be converted to either a National television System Committee (NTSC) video format (i.e., interlaced 60 fields per second), or a Phase Alternate Line (PAL) video format (i.e., interlaced 50 fields per second) in a process called telecine. Two telecine methods are Commonly used, as described in the following. In converting a film to NTSC video, each frame $F_i$ of the film is decomposed into two fields of video (i.e., a top field $T_i$ and a bottom field $B_i$) and every four fields are followed by a field that repeats a preceding same-parity field. For example, if the frame sequence of the film is $F_0\ F_1\ F_2\ F_3\ F_4\ldots$, the resulting field sequence of video is $T_0\ B_0\ T_1\ B_1\ T_1\ B_2\ T_2\ B_3\ T_3\ B_3\ T_4\ B_4\ldots$ The above telecine method is called a 3:2 pull-down method. When a film is converted into PAL video, each frame of the film is simply decomposed into two fields of video and no repeated fields are inserted. For example, if the frame sequence of the film is $F_0\ F_1\ F_2\ F_3\ F_4\ldots$, the resulting field sequence of video is $T_0\ B_0\ T_1\ B_1\ T_2\ B_2\ T_3\ B_3\ T_4\ B_4\ldots$ The above telecine method is called a 2:2 pull-down method. In converting a film to PAL video using the 2:2 pull-down method, the converted video runs 4% faster than the original film. Furthermore, the 2:2 pull-down method is sometimes used in converting portions of a film into NTSC video, especially for fast pans in which the 3:2 pull-down method may cause a jerky impression to the viewer.

To display an interlaced video sequence on a progressive device smoothly, such as an LCD TV or a Plasma TV, the video sequence is converted to a progressive sequence. The conversion process is called a de-interlacing method. Many conventional de-interlacing techniques exist, such as "bob", "weave", directional interpolation, motion adaptive blending and motion compensated blending. Among the conventional methods, the "bob" method and the "weave" method are the two simplest methods. In the "bob" method, a progressive frame is generated from a field by simple vertical interpolation within the field. In the "weave" method, a progressive frame is generated by simply interleaving two neighboring opposite-parity fields. The "bob" method is normally used for scenes with fast motion when motion compensation is unavailable or unreliable. The "weave" method is normally used for stationary scenes because the full vertical resolution of the scenes is retained.

In a case where a video sequence is generated from a film through the 3:2 pull-down or the 2:2 pull-down, a perfect de-interlacing can be achieved for the sequence if a correct determination can be made of which two fields in the input sequence originated from a same progressive frame. In particular, a determination should be made whether a current field $f_N$ should be "weaved" with a previous field $f_{N-1}$ since $f_N$ and $f_{N-1}$ originated from the same progressive frame, or the current field $f_N$ should be "weaved" with a next field $f_{N+1}$ since $f_N$ and $f_{N+1}$ originated from the same progressive frame. The process of combining the interlaced fields back into the original frames is called inverse telecine.

The inverse telecine processes are often more complicated than expected due to several reasons, such as noise introduced in the video processing chain, scene changes and post-edit. In an example case of post-edit, interlaced text is frequently added to a video sequence for the purpose of distributing breaking news, weather alert, stock information, copyright and the like. The added text often scrolls horizontally or vertically across the picture. If a sequence of fields with scrolling text is detected as regular 3:2 pull-downed or 2:2 pull-downed fields and the "weave" method is used to de-interlace, noticeable interlacing artifacts will often appear around the moving text. To avoid such situations, a method to detect moving interlaced text in a video sequence originated from film through telecine would be preferred. Text in the original film should not be detected as moving interlaced text, since such text is actually part of the original progressive material. For sequences with stationary but fading text, if the fading is from field to field, text should be detected as moving interlaced text since "weave" will cause noticeable artifacts in de-interlacing the fading fields. Such sequences are sometimes seen in commercials.

SUMMARY OF THE INVENTION

The present invention concerns a method for detecting moving interlaced text in a video sequence originating through telecine. The method generally comprises the steps of (A) checking a motion condition of a current block in a current field in the video sequence for motion both (i) from a previous field in the video sequence to the current field and (ii) from the current field to a next field in the video sequence, (B) checking an artifact condition of the current block for a plurality of symmetric interlaced artifacts in both (i) a forward temporal direction and (ii) a backward temporal direction and (C) asserting a block motion indicator for the current block if all of (i) the motion condition is true and (ii) the artifact condition is true.

The objects, features and advantages of the present invention include providing detection of moving interlaced text for film mode decision that may (i) properly detect moving interlaced text in a video sequence originated from film through telecine, (ii) account for 3:2 pull-down detection, (iii) provide accurate 2:2 pull-down detection, (iv) distinguish moving text in the original progressive material and/or (v) detect stationary but fading text as moving interlaced text.

BRIEF DESCRIPTION OF THE DRAWINGS

These and other objects, features and advantages of the present invention will be apparent from the following detailed description and the appended claims and drawings in which:

FIGS. 6-9 are tables of test results for the moving interlaced text decision method.

DETAILED DESCRIPTION OF THE PREFERRED EMBODIMENTS

Figure 1:
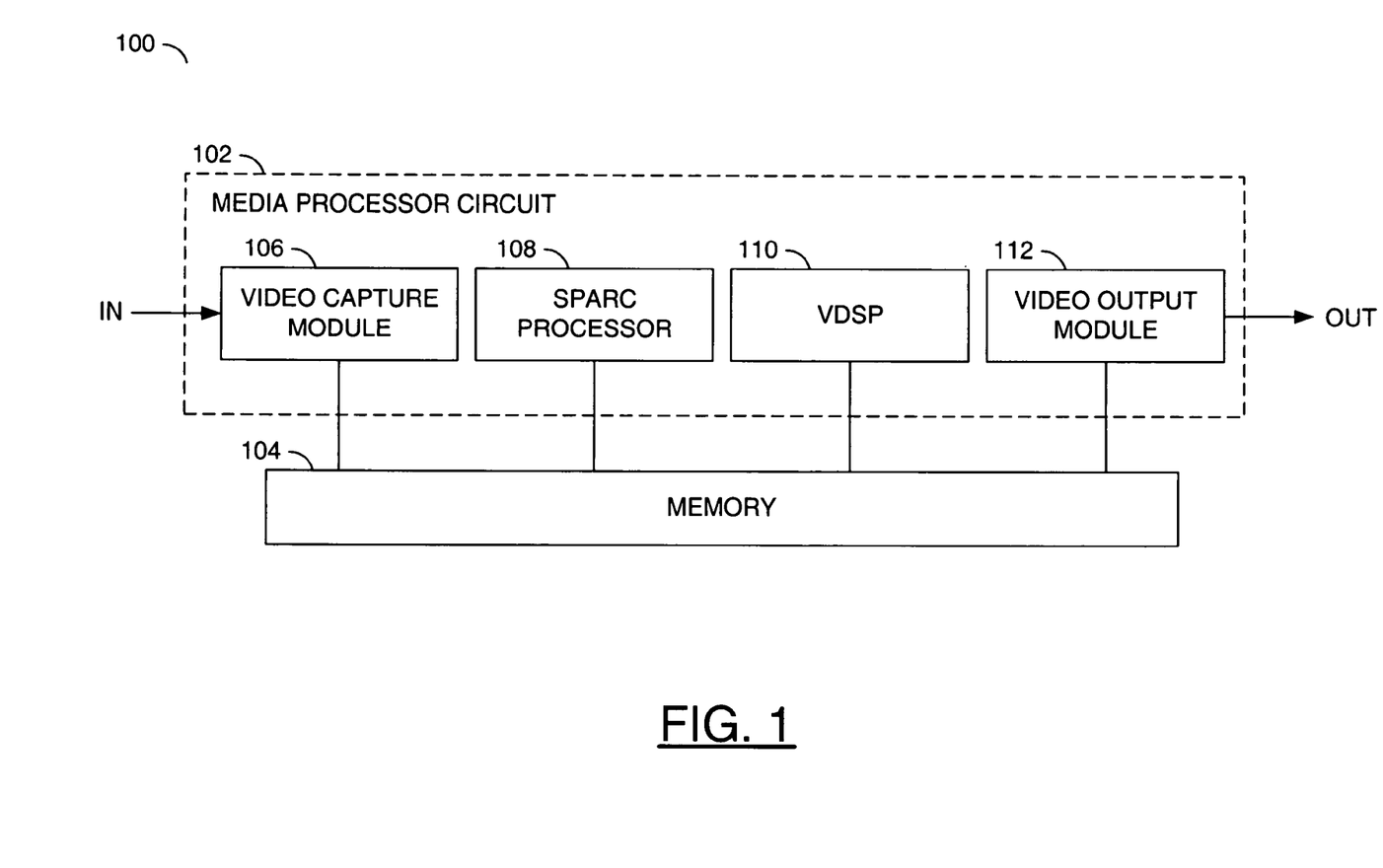
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system (or circuit) 100 may be referred to as a network media system. The network media system 100 generally comprises a circuit (or module) 102 and a circuit (or module) 104. An input signal (e.g., IN) may be received by the circuit 102. The circuit 102 may generate an output signal (e.g., OUT). The circuit 102 may be in communication with the circuit 104 to move video data and video-related information back and forth.

The signal IN may be an analog video signal or a digital video signal that has undergone telecine processing. The signal IN generally comprises a sequence of interlaced-format fields created from a sequence of film frames, a sequence of cartoon frames and/or a normally interlaced material. The signal OUT may be an analog video signal or a digital video signal. The signal OUT generally comprises a sequence of progressive-format frames with some possible interlaced fields mixed within. The frames may be created by inverse telecine processing the interlaced fields received in the signal IN.

The circuit 102 may be referred to as a media processor circuit. The media processor circuit 102 may be operational to gather statistics on the fields from the video signal IN. The media processor circuit 102 may also detect if the fields are in a 3:2 pull-down pattern to control a plurality of 3:2 pull-down flags based on a plurality of statistics gathered from the fields. Simultaneously, the media processor circuit 102 may detect if the fields contain moving interlaced text to control a moving interlaced text flag based on both (i) the statistics and (ii) a repeat-field flag of the 3:2 pull-down flags that indicates a repeating consecutive same polarity field. The media processor may be further configured to detect if the fields are in a 2:2 pull-down pattern based on the statistics to control a plurality of 2:2 pull-down flags. Furthermore, the media processor circuit 102 may decide among a plurality of inverse telecine processes to de-interlace said fields based on all of (i) a 3:2 mode flag, (ii) a 3:2 direction flag, (iii) the moving interlaced text flag, (iv) a 2:2 mode flag and (v) a 2:2 direction flag. A decision may then be made to allocate one or more inverse telecine processes to convert the interlaced fields into frames based on the flags. If the decision is "no weaving", the video out circuit 112 may use other de-interlacing methods to generate progressive frames (e.g., the signal OUT may still carry progressive frames, just not generated from "weaving".) The decision may include a solution not to inverse telecine the fields, thus presenting the interlaced fields in the signal OUT.

The circuit 104 may be referred to as a memory circuit. The memory circuit 104 may be operational to temporarily buffer digital versions of the interlaced fields and digital versions of the progressive frames. The memory circuit 104 may be implemented as a single data rate (SDR) dynamic random access memory (DRAM) or a double data rate (DDR) DRAM. Other memory technologies may be implemented to meet the criteria of a particular application.

The media processor circuit 102 generally comprises a circuit (or module) 106, a circuit (or module) 108, a circuit (or module) 110 and a circuit (or module) 112. The circuit 106 may receive the signal IN. The signal OUT may be generated and presented by the circuit 112. All of the circuits 106, 108, 110 and 112 may be in communication with the memory circuit 104 to read and write video data, video-related information and other data.

The circuit 106 may be referred to as a video capture circuit. The video capture circuit 106 may be operational to capture (e.g., digitize) the interlaced fields from the signal IN. In some embodiments, the video capture circuit 106 may also be operational to gather statistics from the fields of the signal IN.

The circuit 108 may be referred to as a processor circuit. The processor circuit 108 may be operational control the overall operations of the network media system 100. The processor circuit 108 may be implemented as a SPARC processor. Other processor technologies may be implemented to meet the criteria of a particular application.

The circuit 110 may be referred to as a video digital signal processor (VDSP) circuit. The VDSP circuit 110 may be operational to perform high speed processing on the video data. In some embodiments, the VDSP circuit 110 may be operational to gather the statistics from the fields in the signal IN.

The circuit 112 may be referred to as a video output circuit. The video output circuit 112 is generally operational to generate the signal OUT. The video output circuit 112 may include a de-interlacing capability (or block) for generating progressive-format frames. The de-interlacing capability may provide one or more methods (or processes) for de-interlacing the interlaced fields.

Figure 2:
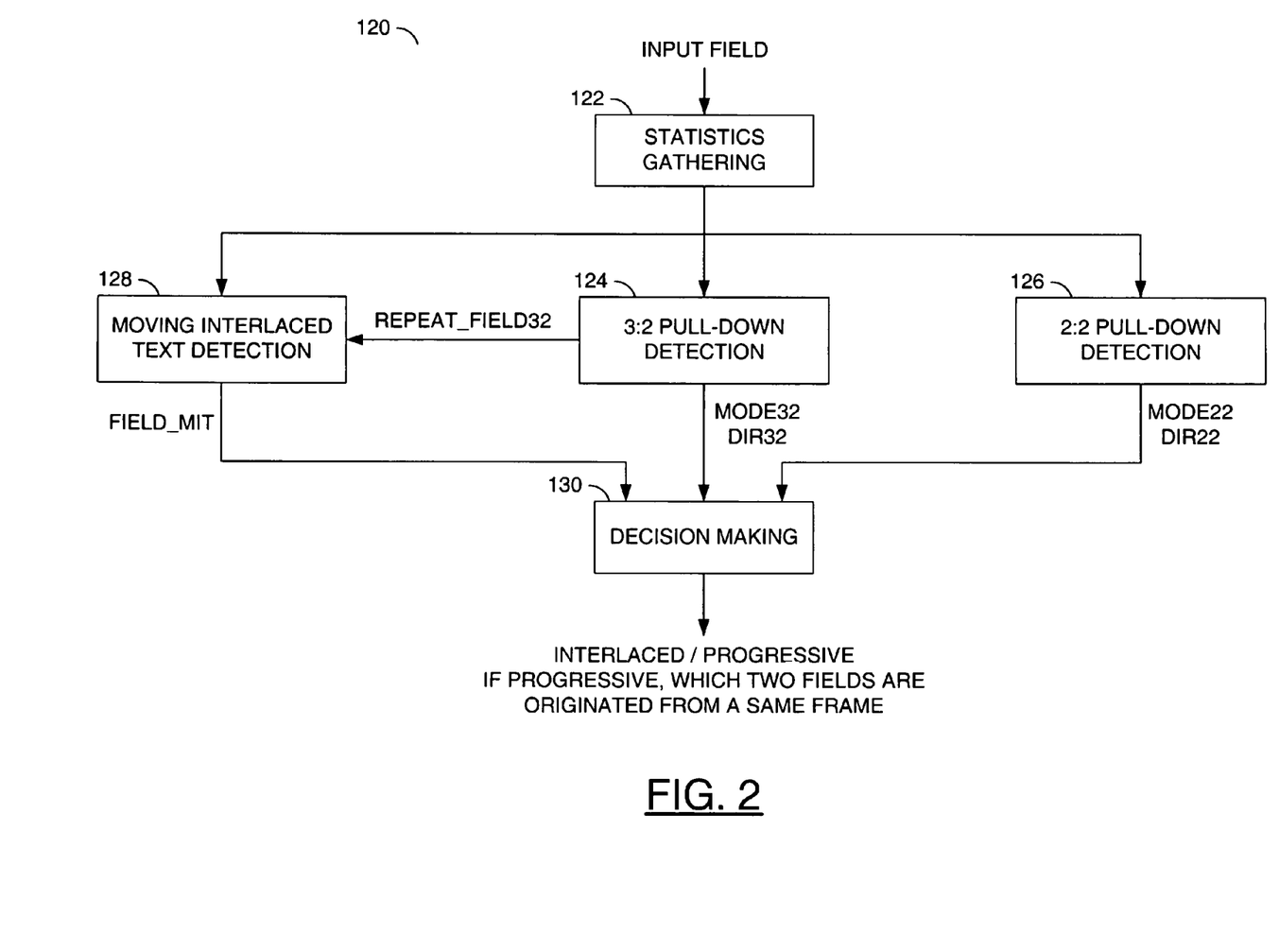
FIG. 2 is a flow diagram of an example method for a unified approach to film mode detection.

Referring to FIG. 2, a flow diagram of an example method 120 for a unified approach to film mode detection is shown. The method (or process) 120 generally comprises a step (or block) 122, a step (or block) 124, a step (or block) 126, a step (or block) 128 and a step (or block) 130.

For each input field received in the input signal IN, the video capture module 106 and/or the VDSP circuit 110 may gather (or calculate) statistics from the fields in the step 122. The statistics may be used by other steps to decide how to covert the fields into frames for the output signal OUT. Further details regarding the statistics are generally provided below.

Based on the gathered statistics, a 3:2 pull-down detection may be performed by the VDSP circuit 110 in the step 124. The detection may determine whether or not a regular 3:2 pull-down pattern exists in the input field sequence. The VDSP circuit 110 may generate one or more binary 3:2 pull-down flags (e.g., a telecine mode flag MODE32, a direction flag DIR32 and a repeated field flag REPEAT_FIELD32) as a result of the detection operation. When the flag MODE32 is asserted (e.g., a logical one or boolean true), the detected sequence is locked into the 3:2 pull-down mode. If the flag MODE32 is de-asserted (e.g., a logical zero or boolean false), the 3:2 pull-down mode has not been detected. In a case where MODE32 is asserted and DIR32 has a reverse direction (e.g., a logical one or "1"), the current field (e.g., $f_N$) and a preceding field (e.g., $f_{N-1}$) may have been detected as originating from a same progressive frame. In a case where MODE32 is asserted and DIR32 has a forward direction (e.g., a logical zero or "0") the current field $f_N$ and a next field (e.g., $f_{N+1}$) may have been detected as originating from a same progressive frame. An assertion (e.g., a logical one or boolean true) of the flag REPEAT_FIELD32 generally indicates that the current field $f_N$ has been detected as a repeated field of a previous same-polarity field (e.g., $f_{N-2}$). A de-assertion (e.g., a logical zero of boolean false) of the flag REPEAT_FIELD32 generally indicates that the current field $f_N$ has not been detected as a repeated field. The flag PREPEAT_FIELD32 may be available to the step 128. Further details of the 3:2 pull-down detection may be found in the co-pending U.S. patent application Ser. No. 11/272,300.

Based on the gathered statistics, a 2:2 pull-down detection may be performed by the VDSP circuit 110 in the step 126. The detection may determine whether or not a regular 2:2 pull-down pattern exists in the input field sequence. The VDSP circuit 110 may generate one or more binary 2:2 pull-down flags (e.g., a mode flag MODE22 flag and a direction flag DIR22) as a result of the detection operation. An assertion (e.g., a logical one or boolean true) of the flag MODE22 generally means that the sequence of fields is locked into the 2:2 pull-down mode. A de-assertion (e.g., a logical zero or boolean false) of the flag MODE22 may indicate that the 2:2 pull-down pattern was not detected. In a case where MODE22 is asserted and DIR22 indicates a reverse direction, the current field $f_N$ and the preceding field $f_{N-1}$ may have been detected as originating from a same progressive frame. In a case where MODE22 is asserted and DIR22 is de-asserted, the current field $f_N$ and the following field $f_{N+1}$ may have been detected as originating from a same progressive frame. Further details of the 2:2 pull-down detection may be found in the co-pending U.S. patent application Ser. No. 11/272,300.

In the step 128, the VDSP circuit 110 may check the fields to determine if moving interlaced text is present. If moving interlaced is detected, the VDSP circuit 110 may also determine (i) if the movement is vertical or horizontal and (ii) if rows or columns contain the moving text as part of the step 128. The VDSP circuit 110 may generate a binary moving interlaced text flag (e.g., FIELD_MIT) as a result of the detection operation. The flag FIELD_MIT generally indicates whether or nor the current field $f_N$ contains moving interlaced text. An assertion (e.g., a logical one or boolean true) of the flag FIELD_MIT generally means that the moving interlaced text has been detected. A de-assertion (e.g., a logical zero or boolean false) of the flag FIELD_MIT generally indicates that no moving interlaced text was detected.

A final film mode decision is generally made by the VDSP circuit 110 in the step 130 according to a set of rules. The decision may be responsive to the flags MODE32, DIR32, MODE22, DIR22 and FIELD_MIT. Based on the decision, one among a number of inverse telecine processes may be identified to de-interlace the fields back into progressive frames.

Figure 3:
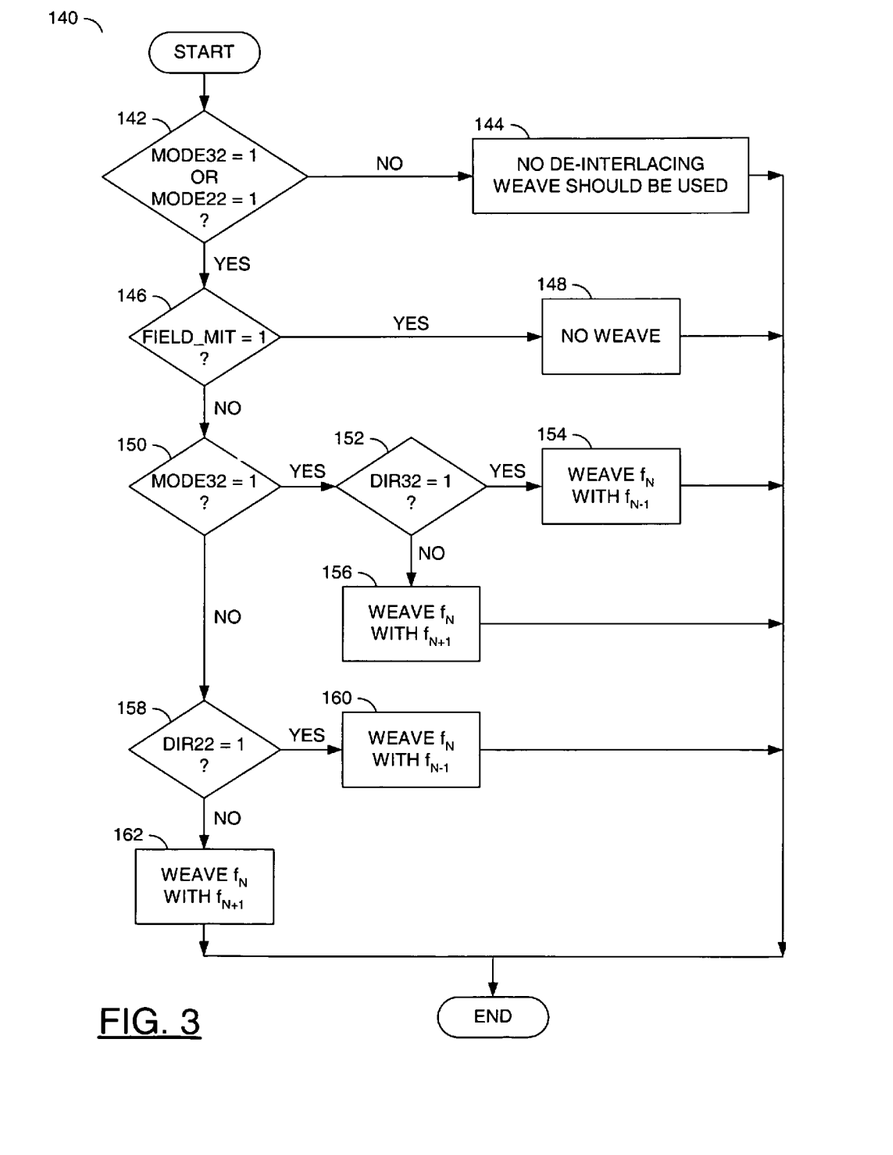
FIG. 3 is a flow diagram of an example implementation of a method for film mode decision making.

Referring to FIG. 3, a flow diagram of an example implementation of a method 140 for film mode decision making is shown. The method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160 and a step (or block) 162.

The method 140 generally starts by checking if the flag MODE32 and/or the flag MODE 22 are asserted in the step 142. If neither of the flags MODE32 and MODE22 are asserted (e.g., the NO branch of step 142), the decision presented in the step 144 may indicate that the interlaced fields are part of an original interlaced sequence (e.g., a non-telecine sequence) and thus the weave inverse telecine process should not be used. Furthermore, the non-telecine fields may be de-interlaced by the video output circuit 112 to generate progressive frames in the signal OUT.

If at least one of the flags MODE32 and MODE22 is asserted (e.g., the YES branch of the step 142), a check may be made of the flag FIELD_MIT in the step 146. If the flag FIELD_MIT is asserted to indicate moving interlaced text (e.g., the YES branch of step 146), the decision presented in the step 148 may indicate use of a non-weave inverse telecine process (e.g., the "bob" process). If the flag FIELD_MIT is de-asserted to indicate that no moving interlaced text was detected (e.g., the NO branch of the step 146), a check may be made of the flag MODE32 in the step 150.

If the flag MODE32 is asserted (e.g., the YES branch of the step 150), a check of the flag DIR32 may be performed in the step 152. If the flag DIR32 indicates the reverse direction (e.g., the YES branch of the step 152), the decision presented in the step 154 may indicate the weave inverse telecine process to combine the current field $f_N$ with the previous field $f_{N-1}$. If the flag DIR32 indicates the forward direction (e.g., the NO branch of the step 152), the decision presented in the step 156 may indicate the weave inverse telecine process to combine the current field $f_N$ with the next field $f_N$.

If the flag MODE32 is de-asserted (e.g., the NO branch of the step 150), a check of the flag DIR22 may be performed in the step 158. If the flag DIR22 indicates the reverse direction (e.g., the YES branch of the step 158), the decision presented in the step 160 may indicate use of the weave inverse telecine process to combine the current field $f_N$ with the previous field $f_{N-1}$. If the flag DIR22 indicates the forward direction (e.g., the NO branch of the step 158), the decision presented in the step 162 may indicate use of the weave inverse telecine process to combine the current field $f_N$ with the next field $f_{N+1}$. Further details of the decision making may be found in the co-pending U.S. patent application Ser. No. 11/314,631.

Figure 4:
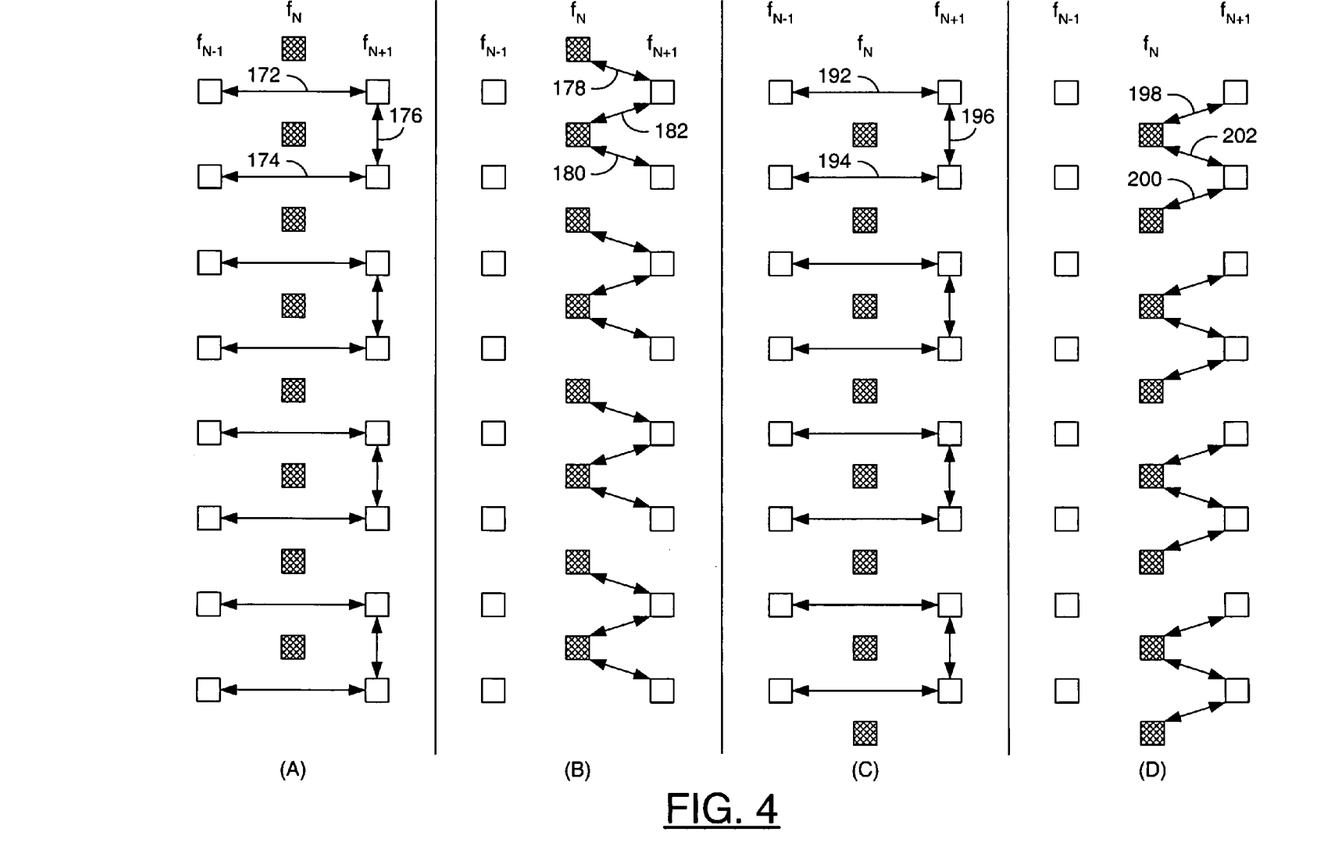
FIG. 4 is a diagram of an example sequence of video fields.

Referring to FIG. 4, a diagram of an example sequence 170 of video fields is shown. The video fields generally comprise alternating odd-parity fields and even-parity fields. The video fields may originate from a progressive source (e.g., film) interlaced through a telecine process or interlaced video.

Let $f_0, f_1, f_2, \ldots$ be a sequence of the video fields. For the purposes of discussion, the polarity of the first field $f_0$ is assumed to be known. Furthermore, a field $f_N$ may be referred to as a current field, a field $f_{N-1}$ may be referred to as a previous field (in time) and a field $f_{N+1}$ may be referred to as a next field (in time). In addition, the top-most line in a strip (or a field) may be conventionally considered an even line.

Detection of moving interlaced text generally involves gathering of statistics both internal to the fields and from field-to-field. The VDSP module 110 may be operational to execute an instruction (e.g., abserr(IN0, IN1)) that may take two pel-strips, denoted as IN0 and IN1, as inputs and return the following four results:

|IN0 even–IN1 even|: the sum of absolute differences (SAD) between the even lines co-located in IN0 and IN1.

|IN0 odd–IN1 odd|: the SAD between the odd lines co-located in IN0 and IN1.

|IN0 even–IN1 odd|: the SAD between the even lines in IN0 and the neighboring odd lines in IN1.

|IN0 odd–IN0 even|: the SAD between the odd lines in IN0 and the neighboring even lines in IN0.

In the unified approach to film mode decision, two abserr instructions may be used per block (e.g., 8×8 pixels) to gather the statistics used to check for the moving interlaced text. FIG. 4, columns (A) and (B) generally illustrate a first case when the current field $f_N$ is a top field. FIG. 4, columns (C) and (D) generally illustrate a second case when the current field $f_N$ is a bottom field.

The following two VDSP instructions may be issued for each 8×8 block in the first case where the current field $f_N$ is the top field:

$$abserr(IN0=f_{N+1}, IN1=f_{N-1}) \qquad (1)$$

$$abserr(IN0=f_{N+1}, IN1=f_N) \qquad (2)$$

From the first abserr in (1) above, the statistics obtained from (1) and (2) include, but are not limited to:

$$SadPrevNext[y][x]=|f_{N-1}even-f_{N+1}even|+|f_{N-1}odd-f_{N+1}odd| \quad (3)$$

$$VerActNext[y][x]=|f_{N+1}odd-f_{N+1}even|*2 \quad (4)$$

where y and x generally define block indices in a vertical direction and a horizontal direction in the field, respectively. The value $|f_{N-1}$ even$-f_{N+1}$ even$|$ from (3) may be visualized as a difference between a previous field pixel and a next field pixel, see for example arrow 172. The value $|f_{N-1}$ odd$-f_{N-1}$ odd$|$ from (3) may be between a previous field pixel and a next field pixel, see for example arrow 174. The value $|f_{N+1}$ odd$-f_{N+1}$ even$|$ from (4) may be between two next field pixels, see for example arrow 176.

From the second abserr in (2) above, the following two statistics may be obtained:

$$SadCurrNext1[y][x]=|f_{N+1}even-f_{N}even|+|f_{N+1}odd-f_{N}odd| \quad (5)$$

$$SadCurrNext2[y][x]=|f_{N+1}even-f_{N}odd|*2 \quad (6)$$

where in (4) and (6), the multiplicative factors of 2 may make the above four statistics (e.g., (3), (4), (5) and (6)) contain the same number of absolute differences. The value $|f_{N+1}$ even$-f_{N}$ even$|$ from (5) may be between a current field pixel and a next field pixel, see for example arrow 178. The value $|f_{N+1}$ odd$-f_{N}$ odd$|$ from (5) may be between a current field pixel and a next field pixel, see for example arrow 180. The value $|f_{N+1}$ even$-f_{N}$ odd$|$ from (6) may be between a current field pixel and a next field pixel, see for example arrow 182.

In the above four statistics, the statistic SadPrevNext is generally a measure of the same-parity SAD. The statistics SadCurrNext1 and SadCurrNext2 are generally measures of opposite-parity SADs and may be thought of as frame vertical activities of the frame formed from weaving fields $f_N$ and $f_{N+1}$. The statistic VerActNext is generally a measure of the field vertical activity of the field $f_{N+1}$.

The following two VDSP instructions may be issued for each 8×8 block in the second case where the current field $f_N$ is a bottom field:

$$abserr(IN0=f_{N+1},IN1=f_{N-1}) \quad (7)$$

$$abserr(IN0=f_{N},IN1=f_{N+1}) \quad (8)$$

While (7) is generally the same as (1), (8) may be different from (2). The difference may make |IN0 even−IN1 odd| meaningful as a measure of the frame vertical activity. The statistics gathered from (7) and (8) may include, not are not limited to:

$$SadPrevNext[y][x]=|f_{N-1}even-f_{N+1}even|+|f_{N-1}odd-f_{N+1}odd| \quad (9)$$

$$VerActNext[y][x]=|f_{N+1}odd-f_{N+1}even|*2 \quad (10)$$

$$SadCurrNext1[y][x]=|f_{N+1}even-f_{N}even|+|f_{N+1}odd-f_{N}odd| \quad (11)$$

$$SadCurrNext2[y][x]=|f_{N}even-f_{N+1}odd|*2 \quad (12)$$

The value $|f_{N-1}$ even$-f_{N+1}$ even$|$ from (9) may be visualized as a difference between a previous field pixel and a next field pixel, see for example arrow 192. The value $|f_{N-1}$ odd$-f_{N+1}$ odd$|$ from (9) may be between a previous field pixel and a next field pixel, see for example arrow 194. The value $|f_{N+1}$ odd$-f_{N+1}$ even$|$ from (10) may be between two next field pixels, see for example arrow 196. The value $|f_{N+1}$ even$-f_N$ even$|$ from (11) may be between a next field pixel and a current field pixel, see for example arrow 198. The value $|f_{N-1}$ odd$-f_N$ odd$|$ from (11) may be between a next field pixel and a current field pixel, see for example arrow 200. The value $|f_N$ even$-f_{N+1}$ odd$|$ from (12) may be between a next field pixel and a current field pixel, see for example arrow 202.

In the stage of processing the current field $f_N$, the following statistics are generally available from processing the previous fields:

SadPrevCurr1: similar to (5) and (11), but calculated from $f_{N-1}$ and $f_N$.

SadPrevCurr2: similar to (6) and (12), but calculated from $f_{N-1}$ and $f_N$

VerActPrev: similar to (4) and (10), but calculated from $f_{N-1}$

VerActCurr: similar to (4) and (10), but calculated from $f_N$

Noise inherent in the input sequence may affect the statistics calculated from the sequence, and thus should be considered. A noise value (e.g., NOISE) may be estimated at a field level as follows:

$$CURR\_NOISE=min\{min(SadPrevNext[y][x],VerActCurr[y][x])\} \quad (13)$$

$$NOISE=(PREV\_NOSIE)*15+CURR\_NOISE)/16 \quad (14)$$

The outer minimization in (13) may be over all of the blocks with 0<x<((W/8)−1), 0<y<((H/8)−1), where H is a field height and W is a field width of the input sequence. The inner minimization in (13) may be over the two items SadPrevNext[y][x] and VerActCurr[y][x] inside the parentheses. The variable PREV_NOISE in (14) is generally a noise level estimated in processing the previous field.

For each 8×8 block in the current field $f_N$, a binary flag (e.g., BLK_MIT) may be assigned. A de-assertion to false or a logical zero value of the flag BLK_MIT generally indicates that the block is less likely to contain moving interlaced text. An assertion to true or a logical one value of the flag BLK_MIT generally indicates that moving interlaced text may be present. A value for the flag BLK_MIT may be determined according to the following rule: BLK_MIT [y][x]=1 if the following conditions (15)-(20) are all met; otherwise BLK_MIT [y][x]=0:

$$SadPrevNext[y][x]>REPEAT\_FIELD32?(3*AvgSadPrevNext):Noise+TH \quad (15)$$

$$d>b \quad (16)$$

$$e>c \quad (17)$$

$$max(d,e)*2<3*min(d,e) \quad (18)$$

$$VerActCurr[y][x]>max(NOISE+TH,1.5*f) \quad (19)$$

$$f<min(NOISE+TH,g/2) \quad (20)$$

where
b=(VerActPrev[y][x]+VerActCurr[y][x])/2;
c=(VerActCurr[y][x]+VerActNext[y][x])/2;
d=(SadPrevCurr1[y][x]+SadPrevCurr2[y][x])/2;
e=(SadCurrNext1[y][x]+SadCurrNext2[y][x])/2;
f=min(VerActCurr[j][i]), y−1≦j≦y+1, x−1≦i≦x+1
g=max(VerActCurr[j][i]), y−1≦j≦y+1, x−1≦i≦x+1
Furthermore, the terminology "W=X?Y:Z" generally means that if X is true or not equal to zero, then W evaluates to the value of Y, otherwise W evaluates to the value of Z.

In condition (15), the flag REPEAT_FIELD32 may be a binary flag generated from the 3:2 pull-down detection. REPEAT_FIELD32=1 generally indicates that the current field $f_N$ is a repeated field. REPEAT_FIELD32=0 generally indicates that the current filed $f_N$ is not a repeated field. The parameter AvgSadPrevNext may be an average of SadPrevNext values of non-boundary blocks in the current field $f_N$. The threshold parameter TH may be a programmable parameter with a default value (e.g., 1024). The condition (15) evaluating to true may imply the existence of motion from the field $f_{N-1}$ to the field $f_{N+1}$ at the current block position [y][x].

The conditions (16), (17) and (18) evaluating to true may imply the existence of the symmetric interlacing artifacts in a forward temporal direction and a backward temporal direction. The condition (19) evaluating to true generally implies high activities (e.g., vertical activities and/or horizontal activities) in the current block position [y][x]. The high activities may be in terms of an absolute value and/or relative to the activity in neighboring blocks. A high activity in the current block surrounded by low activity in adjacent blocks may be characteristic of text in video.

The condition (20) evaluating to true generally means that a block with low-activity, in terms of an absolute value and/or relative to the most active block in the neighborhood, exists in the neighboring blocks. The condition (20) may be characteristic of most text in video. In some embodiments, the total activity of a block for the conditions (19) and (20) (e.g., the summation of vertical activity and horizontal activity) may be used. However, if the horizontal activity of a block is not available, just vertical activities may be used. Generally, BLK_MIT [y][x] alone may not be sufficiently reliable to indicate the existence of moving interlaced text. Further evidences may be gathered in row-of-block level and over a number of fields, as described below.

The following two cases may account for most of the occurrences of moving interlaced text: (i) a line of text scrolling in the horizontal direction in the picture and (ii) a single line or multiple lines of text scrolling in the vertical direction. Therefore, a strong evidence regarding moving interlaced text may be collected from a maximum number of blocks in a row with BLK_MIT=1. As such, a variable (e.g., ROW_MIT) may be defined as in the following:

$$\text{ROW\_MIT} = \max_{0<y<\frac{H}{8}-1} \left( \sum_{0<x<\frac{W}{8}-1} \text{BLK\_MIT}[y][x] \right) \quad (21)$$

The value of the variable ROW_MIT is generally a maximum number of blocks in a row with BLK_MIT[y][x]=1. A top row and a bottom row in the field may be excluded in the calculation. Furthermore, a left-most block and a right most-block in a row may also be excluded. The larger the value of ROW_MIT, the more probable that the current field may contain moving interlaced text.

Figure 5:
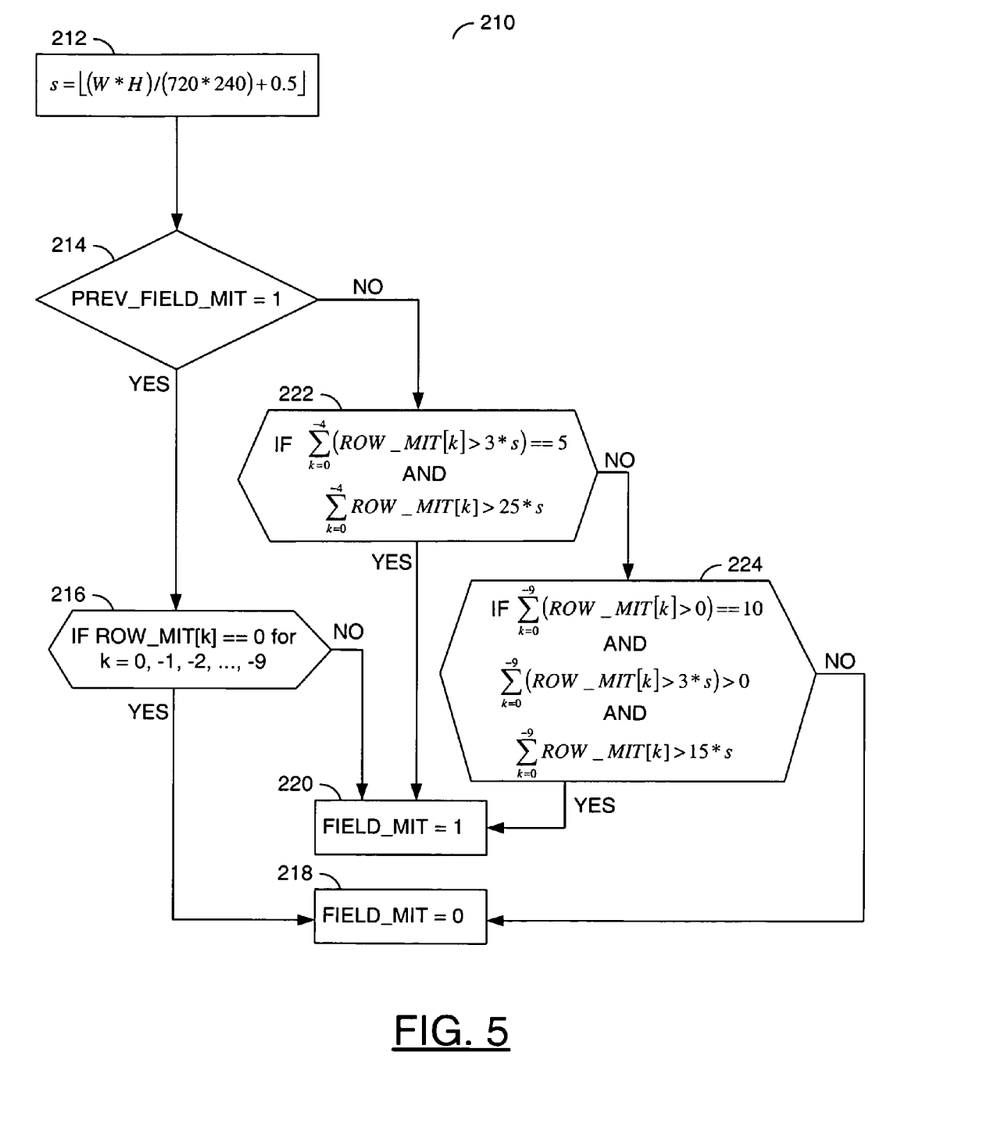
FIG. 5 is a flow diagram of an example method for a moving interlaced text decision.

Referring to FIG. 5, a flow diagram of an example method 210 for a moving interlaced text decision is shown. The method (or process) 210 generally comprises a step (or block) 212, a step (or block) 214, a step (or block) 216, a step (or block) 218, a step (or block) 220, a step (or block) 222 and a step (or block) 224. For moving interlaced text, the following observations may be applicable to the decision method 210:

Observation 1: Moving interlaced text almost always appears in a number of consecutive fields.

Observation 2: For horizontally scrolling text, two situations may exist. In a first situation, the scrolling text may start to appear at one end of the picture and gradually move toward the other end with more and more text shown. In a second situation, a line of the scrolling text may appear at the center of picture and move toward an end. For the first situation, the viewer may tolerate missing the first several fields with the scrolling text. The tolerance is generally because only a few text characters may appear in such fields and the text appears at the corner of the picture. For the second situation, the moving interlaced text should be recognized quickly since the scrolling text appears at the center of the field and generally contains a significant amount of text.

Observation 3: For vertically scrolling text, the text may not appear in the same horizontal position in consecutive fields.

For purposes of discussion, let (i) ROW_MIT[0] be a value of ROW_MIT calculated for the current field $f_N$, (ii) ROW_MIT[-1] be a value of the previous field $f_{N-1}$, (iii) ROW_MIT[-2] be a value of the field $f_{N-2}$, and so on. The above values may not always be calculated from the same row in the fields involved, for the reason stated in the third observation above. Let FIELD_MIT be a flag to indicate an existence/absence of moving interlaced text in the current field. Assertion to true or a logical one value of the flag FIELD_MIT generally implies the existence of moving interlaced text in the current field. A de-assertion or a logical zero value of the flag FIELD_MIT generally implies no moving interlaced text has been detected.

In the step 212, a constant "s" may be generated. The constant "s" generally accounts for the effects of different picture sizes. Generally, the bigger the picture size, the larger number of text-carrying blocks should appear in a block row in order to have FIELD_MIT=1. Larger number of blocks should be considered to assert FIELD_MIT=1 since the block size may be fixed (e.g., 8×8 pixels).

A check may be made in the step 214 to determine if the previous field contained moving interlaced text. If moving interlaced text was detected in the previous field (e.g., the YES branch of step 214), multiple checks may be made to see if the moving interlaced text appeared in a number of consecutive fields per Observation 1. If no moving text was detected (e.g., the NO branch of step 214), a check may be made to see if the moving interlaced text has just appeared in the current field.

In the step 216, multiple checks may be made to determine if the most recent fields (e.g., the 10 most recent fields, including the current field) produce no indication of moving interlaced text in any of the fields. If interlaced moving text has not been detected in at least one of (i) the current field or (ii) any of the most recent fields (e.g., the YES branch of step 216), the flag FIELD_MIT for the current field may be de-asserted to a logical zero in the step 218. If all of the (i) the current field and (ii) the most recent fields are determined to have moving interlaced text (e.g., the YES branch of step 216), the flag FIELD_MIT for the current field may be set to a logical one in the step 220.

In the step 222, a check may be made to determine if fast moving interlaced text is recognizable in the current field. If fast moving interlaced text is quickly detected (e.g., the YES branch of step 222), the flag FIELD_MIT for the current field may be asserted to a logical one in the step 220 to indicate the present of moving interlaced text. If fast moving interlaced text is not recognized (e.g., the NO branch of step 222), a check may be made in the step 224 for slow moving interlaced text in the step 224. If slow moving interlaced text is reliably detected, (e.g., the YES branch in step 224), the flag FIELD_MIT may be asserted to a logical one in the step 220. If no slow moving interlaced text is detected (e.g., the NO branch of step 224), the flag FIELD_MIT may be de-asserted to a logical zero value in the step 218.

Figure 7:
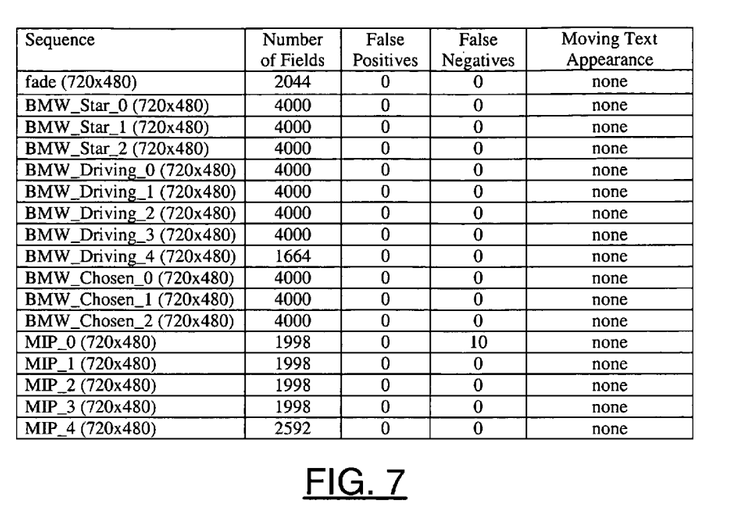
Figure 8:
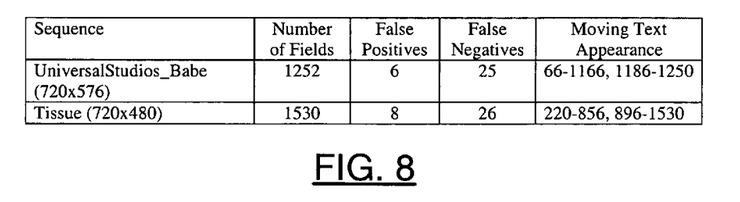
Figure 9:
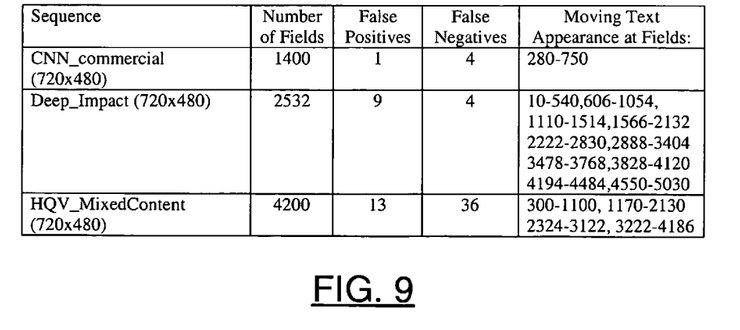

Referring to FIGS. 6-9, tables of test results for the decision method 210 are shown. Each of the FIGS. 6-9 generally covers one of the following four groups of sequences. FIG. 6 is a 2:2 pull-downed sequence without moving interlaced text. FIG. 7 is a 3:2 pull-downed sequence without moving interlaced text. FIG. 8 is a 2:2 pull-downed sequence with moving interlaced text. FIG. 9 is a 3:2 pull-downed sequence with moving interlaced text.

Two terms were generally used in the tests to measure an accuracy of the method 210: false positive and false negative. A false positive may mean that a field without moving interlaced text is detected as having moving interlaced text. A false negative may mean that a field with moving interlaced text is detected as having no moving interlaced text. For each sequence in the four groups, both false positives (e.g., third column) and false negatives (e.g., fourth column) are generally reported in FIGS. 6-9. Note that for the sequence in the last two groups (e.g., FIGS. 8 and 9), each sequence generally contained a number of transitions from segments with moving interlaced text to segments without moving interlaced text, and vice versa. Therefore, an average of false positives and an average of false negatives was reported in FIGS. 8 and 9.

The function performed by the flow diagrams of FIGS. 2, 3 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for detecting moving interlaced text in a video sequence originating through telecine, comprising the steps of:
   (A) checking a motion condition of a current block in a current field in said video sequence to detect motion both (i) from a previous field in said video sequence to said current field and (ii) from said current field to a next field in said video sequence;
   (B) checking an artifact condition of said current block by calculating (i) a first difference between said current block and a next block in said next field, (ii) a first activity between said current block to said next block, (iii) a second difference between a previous block in said previous field and said current block and (iv) a second activity between said previous block to said current block, wherein said artifact condition is true if said first difference is greater than said first activity and said second difference is greater than said second activity;
   (C) asserting a block motion indicator to designate that said current block contains said moving interlaced text if all of (i) said motion condition is true and (ii) said artifact condition is true; and
   (D) deinterlacing said current block in response to said block motion indicator.

2. The method according to claim 1, further comprising the step of:
   checking an activity condition of said current block to detect a high activity in at least one spatial direction within said current block, wherein assertion of said block motion indicator is further based on said activity condition.

3. The method according to claim 1, further comprising the step of:
   checking a neighbor condition of a plurality of neighboring blocks in said current field around said current block to detect a low activity in at least one spatial direction within said current block, wherein assertion of said block motion indicator is further based on said neighbor condition.

4. The method according to claim 1, further comprising the step of:
   measuring a noise level of said current block, wherein said motion condition is determined based on a value of said motion relative to said noise level.

5. The method according to claim 4, further comprising the step of:
   checking a 3:2 pull-down telecine condition of said current field, wherein said motion condition is further determined based on said 3:2 pull-down telecine condition.

6. The method according to claim 1, further comprising the step of:
   generating a plurality of row level indicators of said moving interlaced text based on a plurality of said block motion indicators, wherein each of said block motion indicators is evaluated at one of a plurality of block positions in said current field.

7. The method according to claim 6, further comprising the step of:
   asserting a field motion indicator of said current field if said row level indicators detect rapid moving text.

8. The method according to claim 7, further comprising the step of:
   asserting said field motion indicator if said row level indicators detect slow moving text.

9. The method according to claim 8, further comprising the step of:
   deasserting said field motion indicator of said current field if said row level indicators of (i) said current field and (ii) a fixed number of previous fields in said video sequence do not detect said moving interlaced text.

10. The method according to claim 1, further comprising the step of:
    de-interlacing a portion of said current field having said moving interlaced text using a spatial filter process.

11. A method for detecting moving interlaced text in a video sequence originating through telecine, comprising the steps of:
    (A) checking an activity condition of a current block in a current field in said video sequence to detect a first activity in at least one first spatial direction within said current block, wherein said first spatial direction intersects at least two pixels in said current block;
(B) checking a neighbor condition of a plurality of neighbor blocks in said current field and around said current block to detect a plurality of second activities in at least one second spatial direction within said neighbor blocks;
(C) asserting a block motion indicator to designate that said current block contains said moving interlaced text if all of (i) said activity condition indicates that said first activity has a high value and (ii) said neighbor condition indicates that each of said second activities has a respective low value; and
(D) deinterlacing said current block in response to said block motion indicator.

12. The method according to claim 11, further comprising the step of:
checking a motion condition of said current block to detect motion both (i) from a previous field in said video sequence to said current field and (ii) from said current field to a next field in said video sequence, wherein assertion of said block motion indicator is further based on said motion condition.

13. The method according to claim 11, further comprising the step of:
checking an artifact condition of said current block to detect (i) one or more first artifacts in a forward temporal direction and (ii) one or more second artifacts in a backward temporal direction, wherein said artifact condition is true if said first artifacts interlace in a symmetrical pattern with said second artifacts and assertion of said block motion indicator is further based on said artifact condition.

14. The method according to claim 11, wherein said first spatial direction comprises a vertical direction.

15. The method according to claim 14, wherein said first spatial direction comprises a horizontal direction.

16. The method according to claim 11, wherein said first activity comprises a value above a threshold.

17. The method according to claim 11, wherein said first activity of said current block comprises a value above that of said second activities of said neighbor blocks.

18. The method according to claim 11, further comprising the step of:
measuring a noise level of said current block, wherein said first activity of said current block comprises a value above said noise level.

19. The method according to claim 11, further comprising the step of:
measuring a noise level of said current block, wherein said second activity of said neighbor blocks comprises a value below said noise level.

20. A system comprising:
a memory configured to store a video sequence (i) originating through telecine and (ii) having moving interlaced text; and
a processor configured to (A) check a motion condition of a current block in a current field in said video sequence to detect motion both (i) from a previous field in said video sequence to said current field and (ii) from said current field to a next field in said video sequence, (B) check an artifact condition of said current block by calculating (i) a first difference between said current block and a next block in said next field, (ii) a first activity between said current block to said next block, (iii) a second difference between a previous block in said previous field and said current block and (iv) a second activity between said previous block to said current block, wherein said artifact condition is true if said first difference is greater than said first activity and said second difference is greater than said second activity, (C) assert a block motion indicator to designate that said current block contains said moving interlaced text if all of (i) said motion condition is true and (ii) said artifact condition is true.

* * * * *